United States Patent
Borisoglebski et al.

(10) Patent No.: US 12,388,626 B2
(45) Date of Patent: Aug. 12, 2025

(54) MANAGING A SECURE ELEMENT

(71) Applicant: Truphone Limited, London (GB)

(72) Inventors: Igor Borisoglebski, London (GB); Scott MacKenzie, London (GB); Frederico Gavinho Lima Dos Santos Dias, London (GB); Amilcar Rodrigues Cardoso Pereira, London (GB)

(73) Assignee: TRUPHONE LIMITED, London (GB)

( * ) Notice: Subject to any disclaimer, the term of this patent is extended or adjusted under 35 U.S.C. 154(b) by 298 days.

(21) Appl. No.: 17/707,455

(22) Filed: Mar. 29, 2022

(65) Prior Publication Data

US 2022/0224521 A1    Jul. 14, 2022

Related U.S. Application Data

(63) Continuation of application No. PCT/EP2020/077428, filed on Sep. 30, 2020.

(30) Foreign Application Priority Data

Sep. 30, 2019  (GB) ..................... 1914104

(51) Int. Cl.
 *H04L 9/08* (2006.01)
 *H04L 67/00* (2022.01)
(52) U.S. Cl.
 CPC ............ *H04L 9/0825* (2013.01); *H04L 9/085* (2013.01); *H04L 9/0894* (2013.01); *H04L 67/34* (2013.01)
(58) Field of Classification Search
 CPC ..... H04L 9/0825; H04L 9/085; H04L 9/0894; H04L 67/34

(Continued)

(56) References Cited

U.S. PATENT DOCUMENTS

| 7,162,631 B2 | 1/2007 | Audebert et al. |
| 9,942,094 B1 | 4/2018 | Kovacevic et al. |

(Continued)

FOREIGN PATENT DOCUMENTS

| CN | 102025711 B | 9/2014 |
| CN | 104144405 A | 11/2014 |

(Continued)

OTHER PUBLICATIONS

International Search Report and Written Opinion dated Dec. 7, 2020, for PCT Application No. PCT/EP2020/077428.

(Continued)

*Primary Examiner* — Linglan Edwards
*Assistant Examiner* — Phuc Pham
(74) *Attorney, Agent, or Firm* — Whitestone Law, PLLC (57) ABSTRACT

A method for transmitting configuration data for a secure element is provided. The configuration data is generated in a secure element manager and the method comprises, securing the configuration data using a set of Over-The-Air, OTA, keys associated with the secure element, and transmitting the configuration data using a second interface to a second server for transmitting the configuration data over a non-SMS communications channel A communications network corresponding to the method is also provided. A method of receiving configuration data for a secure element at a host device is also provided. The method comprises receiving the configuration data using a data function for receiving configuration data over a non-SMS communications channel, processing the configuration data using a SIM application toolkit, and forwarding the processed configuration data to the secure element. A host device according to the method is also provided.

17 Claims, 5 Drawing Sheets

(58) Field of Classification Search
USPC .......................................................... 713/171
See application file for complete search history.

(56) References Cited

U.S. PATENT DOCUMENTS

| | | | |
|---|---|---|---|
| 10,104,517 | B2 | 10/2018 | Nitsch et al. |
| 10,349,266 | B1 | 7/2019 | Kant |
| 2012/0172089 | A1 | 7/2012 | Bae et al. |
| 2015/0135279 | A1 | 5/2015 | Hayat |
| 2016/0020803 | A1* | 1/2016 | Cha .................. H04W 76/10 455/558 |
| 2016/0021529 | A1* | 1/2016 | Park .................. H04W 8/205 455/410 |
| 2017/0019818 | A1 | 1/2017 | Xing et al. |
| 2018/0063111 | A1 | 3/2018 | Vasudevan et al. |
| 2018/0152831 | A1 | 5/2018 | Chastain et al. |
| 2019/0065749 | A1* | 2/2019 | Yang .................. G06F 21/572 |
| 2019/0246369 | A1 | 8/2019 | Khan et al. |
| 2019/0253243 | A1* | 8/2019 | Zimmerman .......... H04W 4/80 |

FOREIGN PATENT DOCUMENTS

| | | |
|---|---|---|
| EP | 1928152 A1 | 6/2008 |
| EP | 2182439 A1 | 5/2010 |
| EP | 2350827 A2 | 8/2011 |
| EP | 2975871 A1 | 1/2016 |
| EP | 3171622 A1 | 5/2017 |
| KR | 20070075179 A | 7/2007 |
| KR | 20160009966 A | 1/2016 |
| KR | 20160010236 A | 1/2016 |
| WO | 2011036484 A2 | 3/2011 |
| WO | 2016066253 A1 | 5/2016 |
| WO | 2017155434 A1 | 9/2017 |
| WO | 2018001449 A1 | 1/2018 |
| WO | 2018087696 A1 | 5/2018 |

OTHER PUBLICATIONS

United Kingdom Combined Search and Examination Report dated Mar. 24, 2020 for GB Application No. GB1914104.3.
United Kingdom Examination report dated Feb. 4, 2022 for GB Application No. GB1914104.3.
GSM Association, Official Document SGP.22—"RSP Technical Specification"; Version 2.2.1; Dec. 18, 2018.
GSM Association, Official Document SGP.02—"Remote Provisioning Architecture for Embedded UICC Technical Specification"; Version 3.1; May 27, 2016.
Kwok, Carmen, GSM Association, Official Document SGP.21—"RSP Architecture", Version 2.2, Sep. 1, 2017.
Anonymous, Version 4.0, GSM Association, Non-confidential Official Document SGP.02—"Remote Provisioning Architecture for Embedded UICC Technical Specification", Remote Provisioning Architecture for Embedded UICC Technical Specification Security Classification, Feb. 25, 2019.

\* cited by examiner

MANAGING A SECURE ELEMENT

CROSS-REFERENCE TO RELATED APPLICATIONS

This application is a continuation of International Application No. PCT/EP2020/077428, filed Sep. 30, 2020 which claims priority to UK Application No. GB 1914104.3, filed Sep. 30, 2019, under 35 U.S.C. § 119(a). Each of the above referenced patent applications is incorporated by reference in its entirety.

BACKGROUND

Field of the Invention

The present invention relates to telecommunications and in particular to transmitting and receiving configuration data for a secure element.

Description of the Related Technology

A host device including a Universal Integrated Circuit Card (UICC) or an embedded Universal Integrated Circuit Card (eUICC) may be used to provide communication services through a mobile network infrastructure of a Mobile Network Operator (MNO) or a Mobile Virtual Network Operator (MVNO), or other suitable service to a host device comprising the UICC or eUICC. In order to provide such services, a network operator may provision content, for example configuration data such as International Mobile Subscriber Identity (IMSI), to the UICC or eUICC. The content may be managed and updated via an Over-The-Air (OTA) method. OTA technology may be used to communicate with and manage UICCs or eUICCs without being physically connected to the card.

The OTA-based method may use an OTA Platform using remote application management (RAM) and/or remote file management (RFM) protocols and may use, namely, short message service (SMS) or push notification service to manage UICCs or eUICCs. Therefore, a network operator resorting to an OTA-based method may face expensive implementation costs due to the related infrastructure.

Further, OTA-based methods only work if the UICC or eUICC is attached to the network, specifically, to the carrier's network, that is to say that a host device comprising the UICC or eUICC has network coverage.

Therefore, it is desired to provide an alternative to the traditional OTA-based method to perform UICC or eUICC content management and update.

SUMMARY

According to a first aspect of the present disclosure, there is provided a method of transmitting configuration data for a secure element for receipt by a host device comprising the secure element, the configuration data being generated in a secure element manager in a cellular communications network, the secure element manager comprising:
   a first interface to first server, the first server being for transmitting configuration data to the host device via a Short Messaging Service, SMS, communications channel; and
   a second interface to a second server for transmitting configuration data to the host device via a non-SMS communications channel, the non-SMS communications channel being secured with an encryption protocol using an encryption key associated with the secure element, the method comprising:
   securing the configuration data using a set of one or more Over-The-Air, OTA, keys associated with the secure element to generate configuration data for the secure element; and
   transmitting the configuration data using the second interface.

This may allow configuration data for a secure element, for example, an IMSI or other configuration data, to be transmitted to a secure element even where the secure element and the host device do not have cellular coverage as may usually be provided via an OTA server. In this way, when a host device is unable to receive SMS messages comprising configuration data for the secure element, the host device may receive the configuration data through an alternative bearer, such as Wi-Fi, through a secure communications channel.

According to a second aspect of the present disclosure there is provided a method of receiving configuration data for a secure element from a cellular communications network at a host device comprising:
   the secure element;
   a first data function, the first data function being for receiving configuration data from the cellular network via an SMS communications channel; and
   a second data function for receiving configuration data from the cellular network via a non-SMS communications channel, the non-SMS communications channel being secured with an encryption protocol using an encryption key associated with the secure element, the method comprising:
   receiving configuration data using the second interface;
   processing the configuration data using a subscriber identity module application toolkit, SAT; and
   forwarding the processed configuration data to the secure element.

In this way, configuration data may be received by a host device for a secure element and may be forwarded to processing by the secure element even where the host device does not have cellular network coverage and/or where the secure element does not generally support receiving configuration data via alternative bearers such as Wi-Fi.

According to a third aspect of the present invention there is provided a cellular communications network for transmitting configuration data for a secure element to a host device comprising the secure element, the network comprising:
   a first server, the first server being for transmitting configuration data to the host device via an SMS communications channel; and
   a second server for transmitting configuration data to the host device via a non-SMS communications channel, the non-SMS communications channel being secured with an encryption protocol using an encryption key associated with the secure element,
   wherein the cellular communications network is configured to:
secure the configuration data using a set of one or more OTA keys associated with the secure element to generate configuration data for the secure element; and
   transmitting the configuration data using the second server.

According to a fourth aspect of the present invention there is provided a host device comprising:
   a secure element;

a first data function, the first data function being for receiving configuration data for the secure element from a cellular network via an SMS communications channel; and a second data function for receiving configuration data for the secure element from the cellular network via a non-SMS communications channel, the non-SMS communications channel being secured with an encryption protocol using an encryption key associated with the secure element, wherein the host device is configured to:
  receive configuration data using the second interface;
  process the configuration data using an SAT; and
  forward the processed configuration data to the secure element.

According to a fifth embodiment there is provided a method of transmitting configuration data for a secure element for receipt by a host device comprising the secure element, the configuration data being generated in a secure element manager in a cellular communications network, the method comprising:

securing the configuration data using a set of one or more Over-The-Air, OTA, keys associated with the secure element to generate configuration data for the secure element; and transmitting the configuration data over a communication channel secured using an encryption key, other than the said one or more OTA keys, associated with the secure element.

According to a sixth embodiment there is provided a method of receiving configuration data for a secure element from a cellular communications network, the method comprising:

receiving configuration data, the configuration data being secured using a set of one or more OTA keys associated with the secure element, over a communications channel secured using an encryption key, other than the said one or more OTA keys, associated with the secure element;

forwarding the configuration data to the secure element.

Further features and advantages of the present disclosure will become apparent from the following description of preferred embodiments, given by way of example only, which is made with reference to the accompanying drawings.

BRIEF DESCRIPTION OF THE DRAWINGS

The following drawings serve illustrative purposes and are given by way of example only. The embodiments will be understood by the below detailed description with reference to the accompanying drawings, in which.

DETAILED DESCRIPTION

Certain examples described herein provide a method to transmit configuration data to a secure element. The secure element may be a UICC or an eUICC. The configuration data may be received by a host device comprising the secure element and may be processed and forwarded to the secure element. The secure element may then process the configuration data and/or use the configuration data to configure the secure element, for example, by updating a profile of the secure element. In this context a host device may be any suitable computing device comprising a secure element such as UICC or an eUICC. In some examples, host devices include mobile and/or table computing devices. In other examples, host devices include any computing devices or objects with network connectivity abilities. For example, appliances, autonomous vehicles, and other devices which may be connected to a mobile network. A host device may comprise at least one processor and at least one memory. The at least one memory may comprise a combination of volatile and non-volatile memories. Instructions may be stored on at least one of the memories which when executed by the at least one processor cause the processor to execute methods as described herein. Host devices may include mobile, or fixed, consumer devices, machines, and/or objects in an IoT and M2M context.

The configuration data may be transmitted via a secure communications channel between a carrier network and the host device. The secure communications channel may be operable even in situations where the host device does not have cellular connectivity to the network. The secure communications channel may be secured using an encryption key associated with the secure element.

Figure 1:
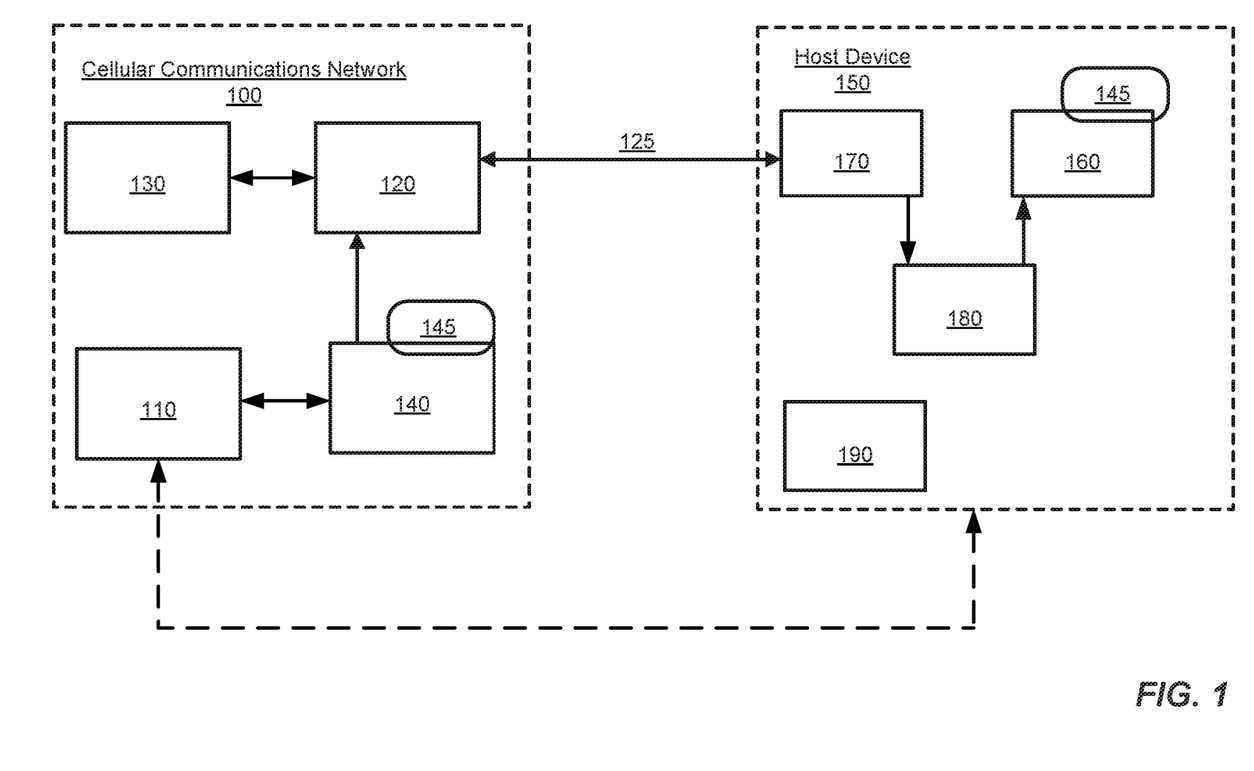
FIG. 1 is a schematic diagram illustrating elements of a cellular communications network and a host device according to an example.

FIG. 1 is a schematic diagram illustrating a cellular communications network 100 and a host device 150 according to examples. The cellular communications network 100 may also be referred to as a carrier network. The cellular communications network 100 may be for transmitting configuration data for a secure element to a host device 150 comprising the secure element. The configuration data may comprise data which can be used to configure the secure element. In some examples, the configuration data comprises data for updating the firmware and/or software included in the secure element. In other examples, the configuration data may be used to configure the secure element such that the secure element may be used to connect to the network 100, or other networks, to provide communications services to the host device 150.

The cellular communications network 100 comprises a first server 110. The first server 110 being for transmitting configuration data to the host device 150 via a Short Message Service communications channel, as is shown in broken lines in FIG. 1. The first server 110 may be referred to as an OTA server. The functionality of the OTA server is described in detail in international patent application having publication number WO2011/036484 A2, the disclosure of which is hereby incorporated by reference.

The OTA server may comprise an OTA gateway which transforms requests into SMSs and sends them onto an SMS Centre (SMSC) which may transmit them to one or several SIM cards in the field. The OTA server may comprise the SMSC or may be communicatively coupled thereto. The OTA server may also generate Service-Requests indicating which cards are to be updated/modified/activated and may send these requests to the OTA gateway.

The cellular communications network 100 comprises a second server 120 for transmitting configuration data to the host device via a non-SMS communications channel 125, the non-SMS communications channel 125 being secured with an encryption protocol using an encryption key associated with the secure element. The non-SMS communications channel may use any suitable bearer, for example Wi-Fi.

In an example, the second server 120 comprises an entitlement configuration server. The entitlement configuration server may be arranged to transmit entitlement configuration data to the host device. An example of an entitlement configuration server is described in GSMA TS.43 VoWiFi and VoLTE Entitlement Configuration v2.0—published 4 Oct. 2018, which is hereby incorporated by reference. As described in GSMA TS.43 VoWiFi and VoLTE Entitlement Configuration v2.0, herein referred to as GSMA TS.43, the entitlement configuration server may use an authentication mechanism such as EAP-AKA. However, other authentication methods and standards may also be used without departing from the scope of the present disclosure.

In the example shown in FIG. 1, the second server 120 is communicatively coupled to an authentication centre 130, however, in other examples the second server 120 may comprise the authentication centre. The establishment of the communications channel will be discussed later with respect to FIG. 3.

The cellular communications network 100 is configured to secure the configuration data using a set of one or more OTA keys 145 associated with the secure element to generate configuration data for the secure element. The cellular communications network 100 may also be configured to transmit the configuration data using the second server 120. The configuration data may be transmitted by the second server 120 for receipt by the host device 150. That is to say that the configuration data may be sent via the communications channel 125 to the host device 150 comprising the secure element. In this way configuration data for the secure element may be transmitted to the host device 150 to be used to configure the secure element even where the host device does not have cellular connectivity with the cellular communications network 100, e.g. via the OTA server. This may allow secure element configuration data to be sent to a device over alternative channels such as via an Internet of Things (IoT), using machine to machine (M2M) communication, or other internet-based communications channels. In this way the host device 150 may not be attached to the network but may still receive updates and/or profile configuration information for the secure element via alternative channels.

In the example shown in FIG. 1, the cellular communications network 100 comprises a secure element manager 140. The secure element manager 140 may be communicatively coupled to the first server 110 and second server 120 via a first interface and a second interface respectively. The first and second interface may each be implemented as any suitable combination of hardware and software components. The secure element manager may be used to monitor and/or manage profiles of subscribers to the network. In some examples, functions of the secure element manager 140 include monitoring ISMIs assigned to secure elements and/ or generating data to be sent to secure elements, including configuration data, for example IMSIs. Examples of a secure element manager 140 are described in WO2011/036484 A2 wherein the secure element manager is referred to as an IMSI broker. However, the secure element 140 of the present disclosure may have additional functions when compared to the IMSI broker as described in WO2011/036484 A2.

In some examples, the configuration data for the secure element may be generated at the secure element manager 140. The secure element manager 140 may communicate with the OTA server 110 to obtain OTA keys which can be used for securing configuration data to be sent to the host device 150. The OTA keys may be obtained from an OTA server and be used by the secure element to ensure that configuration data which is used to configure and/or modify the secure element are received from an authorised source. This may prevent networks which are not authorised to configure the secure element from doing so.

The cellular communications network 100 may also be configured to transmit the configuration data using the second server. This may include, for example, the secure element manager 140 forwarding the configuration data to the first server 120, using a first interface, to be transmitted by the second server 120. The second server 120 may transmit the configuration data for receipt by the host device 150 via a non-SMS communications channel.

FIG. 1 also shows a host device 150. The host device 150 comprises a secure element 160. The secure element may be a UICC or an eUICC. The secure element 160 may comprise the set of one or more OTA keys 145. The OTA keys 145 may be known by the network 100, for example, the OTA keys 145 may be pre-established between the network 100 and the secure element 160. The OTA keys 145 may be updated, for example, via suitable OTA methods, to maintain security.

The host device 150 may comprise a first data function, the first data function being for receiving configuration data for the secure element from a cellular network, for example the cellular network 100, via an SMS communications channel. The SMS communications channel may be established between an OTA server, e.g. server 110, and the host device 150. The host device 150 may also comprise a second data function for receiving configuration data for the secure element from the cellular network 100 via a non-SMS communications channel, the non-SMS communications channel being secured with an encryption protocol using an encryption key associated with the secure element. The second data function may for example receive configuration data from a second server 120. The second server 120 may be configured to communicate with the host device 150 via an internet protocol communications channel, including for example, WiFi. Other examples of suitable bearers for the communications channel 125 include Bluetooth, Near Field Communication (NFC), Infrared, or any other suitable bearer. The first and second data functions of the host device 150 may comprise separate hardware components for receiving data, however, in some implementations the first and second data functions may be virtualised or software based data functions which interact with at least some shared hardware in the host device 150 for receiving data over a suitable bearer.

The example host device 150 shown in FIG. 1 comprises a client module 170. The client module 170 may be configured to establish the communications channel 125 with the second server 120. The host device 150 may also comprise an inbound message queue 180 as will be discussed later with respect to more specific examples of the present disclosure. The inbound message queue 180 may be part of the client module 170. The host device 150 comprises an SAT module 190 which may be used to process received configuration data.

The host device 150 may be configured to receive configuration data using the second data function. This may include receiving configuration data in packets at the client module 170. In some examples, the client module 170 may form at least part of the second data function. The configuration data may be forwarded from the client module 170 to the inbound message queue 180. In some examples, the inbound message queue 180 may also be considered as part of the second data function.

The host device 150 is configured to process the configuration data using an SAT 190. The SAT 190 may be used to package the received configuration data into SIM Toolkit packets for processing by the secure element 160. In this way, the secure element 160 need not be configured to process data which has been received via alternative bearers, for example, over the communications channel 125. This may allow interoperability with secure elements which do not have the capability to process data which is packaged and delivered over a communications channel 125, for example a non-SMS communications channel. This may ensure interoperability between the first server 120 and the host devices (including secure elements) that are receiving said configuration data regardless of the secure elements' operating system functionalities. The host device 150 may then be configured to forward the processed configuration data to the secure element 160.

Figure 2:
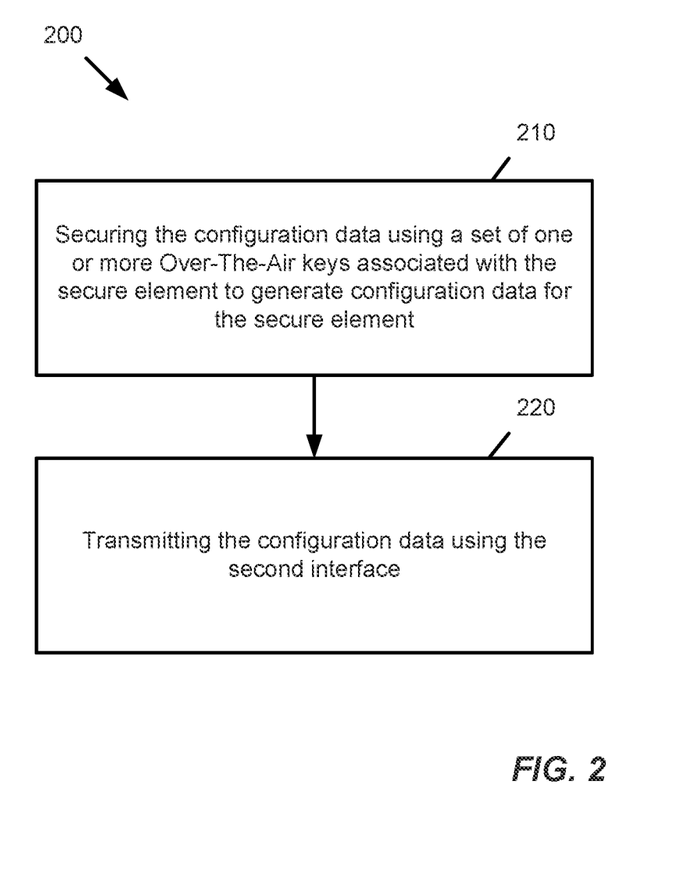
FIG. 2 is a flow diagram illustrating a method according to an example.

FIG. 2 is a flow chart illustrating a method 200 of transmitting configuration data for a secure element for receipt by a host device comprising the secure element. The configuration data is generated in a secure element manager 140 in a cellular communications network 100. The secure element manager 140 comprises a first interface to first server 110, the first server 110 being for transmitting configuration data to the host device 150 via an SMS communications channel. The secure element manager 140 comprises a second interface to a second server 120 for transmitting configuration data to the host device via a non-SMS communications channel 125, the non-SMS communications channel 125 being secured with an encryption key protocol using an encryption key associated with the secure element 160.

At block 210, the method 200 comprises securing the configuration data using a set of one or more OTA keys 145 associated with the secure element 160 to generate configuration data for the secure element 160. The OTA keys 145 for performing a cryptographic checksum and/or may be used as a digital signature to ensure that any configuration data which is used to configure the secure element is received from an authorised network.

At block 220, the method comprises transmitting the configuration data using the second interface. In this way the configuration data may be sent for receipt by the host device 150 via a non-SMS communications channel such that even where the host device does not have cellular coverage, the secure element may still be provided with configuration data.

In some examples, the first server 110 comprises an OTA gateway for sending SMS communications to an SMS centre to be transmitted via an SMS communications channel. The configuration data may be in Application Protocol Data Unit (APDU) format. This may allow the configuration data to be implemented on the secure element 160 following receipt of the configuration data at the host device 150. The configuration data in APDU format may be transmitted in packets using the second server 120, for example using packet switching. The configuration data may be wrapped in a suitable transport wrapper before being transmitted by the second server 120. In some examples, the configuration data maybe wrapped in a suitable transport wrapper before being transmitted using the second interface. In other examples, the configuration data may be wrapped in a suitable transport wrapper at the second server 120 prior to being transmitted.

As discussed above in relation to FIG. 1, the second server 120 may comprise an entitlement configuration server. The entitlement configuration server may be arranged to transmit entitlement configuration data to the host device using the non-SMS communications channel.

Figure 3:
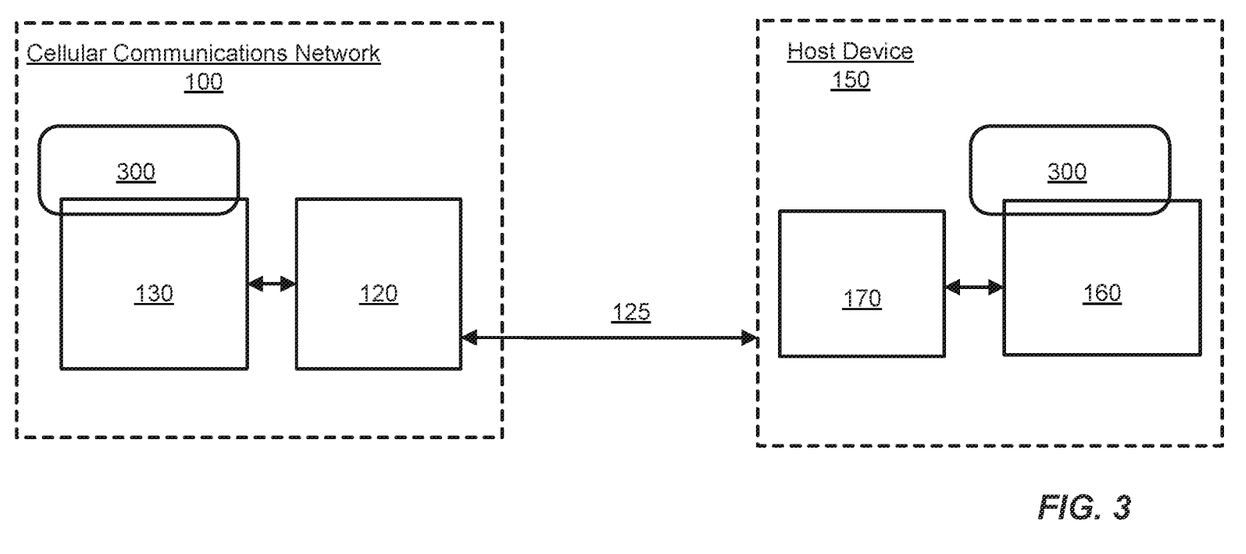
FIG. 3 is a schematic diagram illustrating elements of a cellular communications network and a host device involved in an encryption protocol according to an example.

FIG. 3 shows schematically some elements involved in establishing a communications channel 125 with an encryption protocol. FIG. 3 shows a cellular communications network 100 comprising a second server 120 communicatively coupled to an authentication centre 130. In some examples, the second server 120 may comprise an entitlement configuration server as described above. The second server may also comprise the authentication centre 130. In some examples, the encryption protocol many include EAP-AKA authentication, which is described further in "*Extensible Authentication Protocol Method for 3rd Generation Authentication and Key Agreement (EAP-AKA) RFC 4187*" published by the Internet Engineering Task Force (IETF) in January 2006, the disclosure of which is hereby incorporated by reference. The authentication centre 130 comprises an encryption key 300 associated with the secure element. The encryption key 300 may be pre agreed between the cellular communications network 300 and the secure element 160. FIG. 3 also shows a host device 150 comprising a secure element 160, including encryption key 300, and a client module 170. The encryption key 300 may be used to establish a secure communications channel between the cellular communications network 100 and the host device 150. The exchange of credentials may be operated between the authentication centre 130 by means of the second server 120 communicating with the client module 170 included in the host device 150.

Returning to the method 200 described above, the method 200 may further comprise receiving a read receipt using the second server 120 indicating that the configuration data has been received by the host device 150. In this way, if the configuration data is not successfully received by the host device 150, the cellular communications network 100 may re-transmit the configuration data.

The cellular communications network 100 may also be configured to perform a check for available settings which can be used to configure the secure element 160. The method 200 may comprise identifying information stored in the cellular communications network 100 for configuring the secure element, and the configuration data may be generated using the identified information. For example, the secure element manager 140 may identify information such as an IMSI, available software, and/or firmware for the secure element 160. The secure element manager 140 may then generate configuration data for the secure element 160 based on this identified information.

The check for configuration data may be triggered by the host device 150 and/or the secure element 160. For example, the method 200 may comprise receiving a request for configuration data from the host device 150 via the second server. Identifying information stored in the cellular communications network 100 may be performed in response to the request for configuration data.

Figure 4:
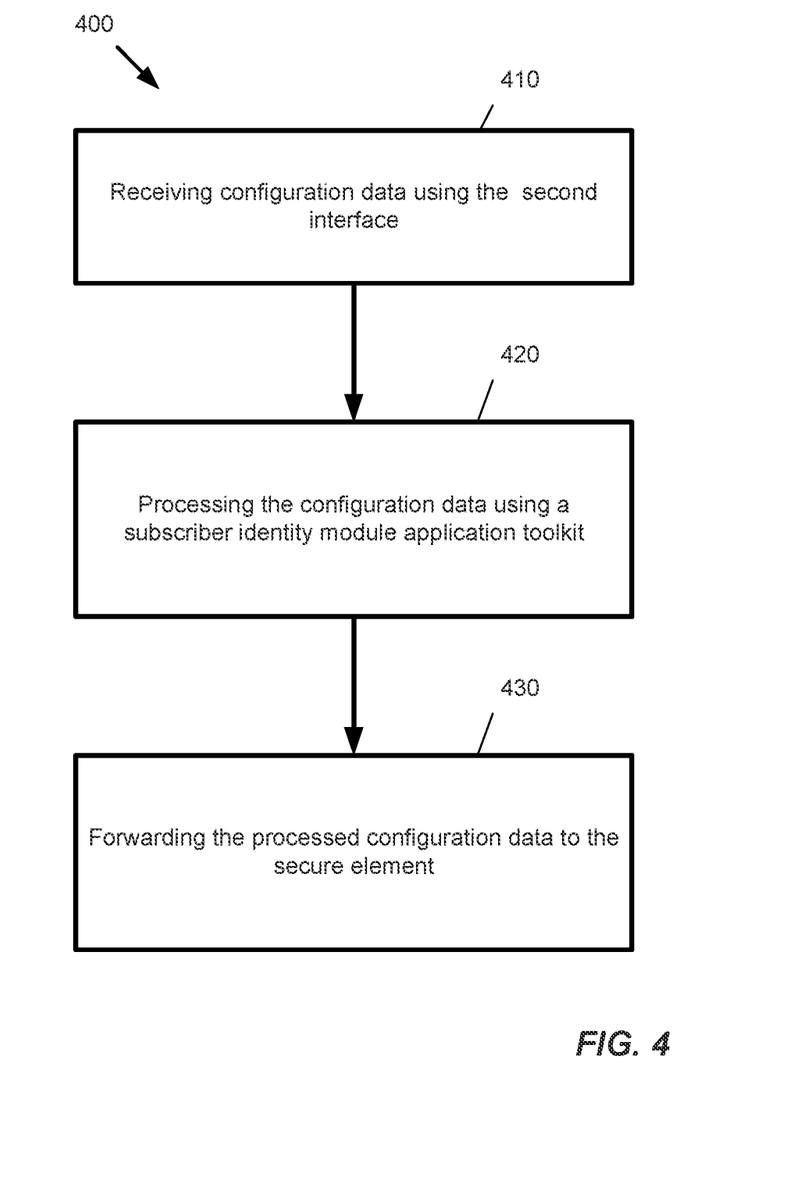
FIG. 4 is a flow diagram illustrating a method according to an example.

FIG. 4 shows a flow chart of a method 400 of receiving configuration data for a secure element 160 from a cellular communications network 100 at a host device 150. The host device 150 comprising a first data function, a second data function, and a secure element. The first data function is for receiving configuration data from the cellular network 100 via and SMS communications channel. The second data function is for receiving configuration data from the cellular network 100 via a non-SMS communications channel, the non-SMS communications channel being secured with an encryption protocol using an encryption key 300 associated with the secure element 160.

At block 410, the method 400 comprises receiving configuration data using the second data function. The second data function may comprise any suitable combination of hardware and software. In some examples, the second data function shares at least some hardware and/or software with the first interface data function. The second data function may comprise, for example, a receiving antenna, a client module 170, an inbound message queue 180, or any other suitable hardware or software components. Receiving the configuration data using the second data function may comprise receiving the configuration data using a client module 170 and queueing the configuration data at an inbound message queue 180.

At block 420, the method 400 comprises processing the configuration data using an SAT 190. Processing the configuration data using the SAT 190 may allow the secure element 160 to process the configuration data regardless of the secure element's 160 operating system's ability to support communications using a non-SMS communications protocol to transport OTA messages and configuration data. This allows interoperability between entitlement configuration servers transmitting data and the host devices that are being used to receive transmitted configuration data.

Processing the configuration data may comprise setting an originating address for the configuration data corresponding to the cellular communications network 100. Where the configuration data is received in packets, the host device 150 may queue the packets at the inbound message queue 180. Processing of the configuration data may be performed before or while the configuration data is queued in the inbound message queue 180.

At block 430, the method 400 comprises forwarding the processed configuration data to the secure element 160. For example, the method 400 may comprise forwarding the configuration data in SIM toolkit packets to the secure element 160. This may be performed using any suitable means for communicating between the host device 150 operating system and the secure element 160. Alternatively, a medium located on the baseband component of the host device 150 may be used to forward the configuration data to the secure element 160. In other examples, a medium located on the secure element 160 itself may be used.

In this way, configuration data may be delivered to the secure element 160 via a non-SMS communications channel which is secured using an encryption protocol, such that the host device 150 may still receive configuration data even where the host device lacks cellular connectivity, which may be the case in low coverage areas or where the host device is roaming and unable to successfully connect to the network.

In some examples, the configuration data is in APDU format. This is a format suitable for the secure element 160 to process and similarly implement instructions indicated therein. In some example, the processed configuration data is further processed by the secure element using a remote file management applet. This may allow the secure element to reconfigure itself based on the configuration data. Being able to process the configuration data in this way may provide interoperability between secure elements and cellular carrier networks transmitting configuration as described herein.

As discussed above, the host device may initiate the process of transmitting configuration data. For example, the method 400 may comprise querying the network for available configuration data using the second data function. The secure element 160 may request the host device 150 to open an HTTP channel to a server of the cellular communications network 100, for example the second server 120. HTTP requests may then be sent in order to check for available content on the cellular communications network 100.

When the configuration data is received at the secure element it may be processed using a set of one or more OTA keys 145 associated with the secure element. The set of OTA keys 145 correspond to the OTA keys 145 which may be used to secure the configuration data. In this way, the secure element 160 is not susceptible to implementing configuration data from insecure or fraudulent sources.

In some examples, the method may comprise generating a proof of receipt of the configuration data and transmitting the proof of receipt to the cellular communications network 100 using the second data function. Where the configuration data is forwarded to the secure element 160 with an originated address being set, once all of the configuration data has been received a synchronous call back to the cellular communications network may be implemented and a proof of receipt, addressed to the originating address which was previously set, may be generated and transmitted.

Figure 5:
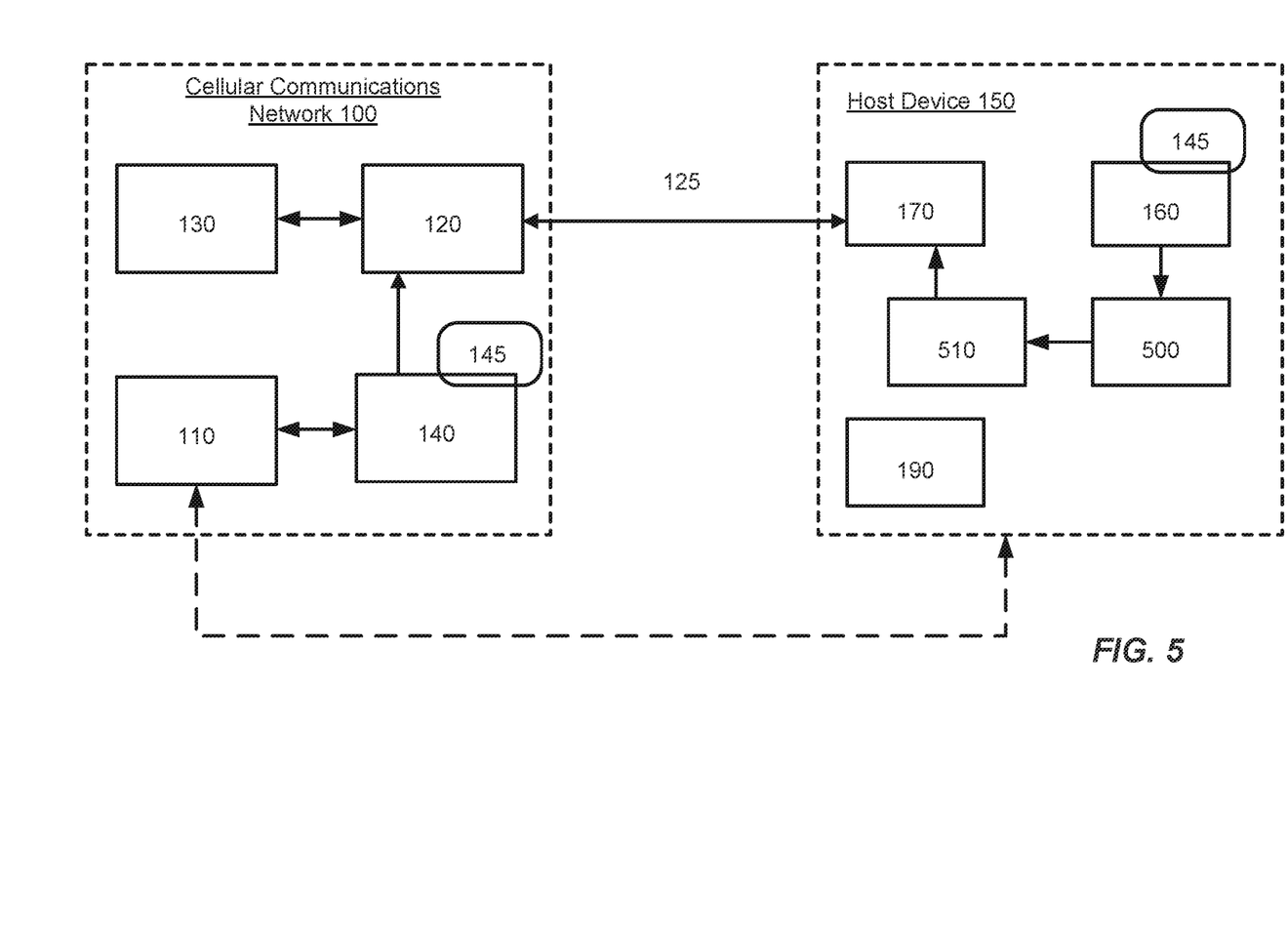
FIG. 5 is a schematic diagram illustrating elements of a cellular communications network and a host device according to an example.

FIG. 5 shows schematically a simplified diagram of elements involved in the generating and transmitting of the proof of receipt. Following successful receipt of the configuration data at the secure element 160, a proof of receipt is generated. The proof of receipt may be generated and transmitted to the cellular communications network using the second data function on the host device, for example, via the non-SMS communications channel. The secure element 160 may generate an SMS message which is queued at an SMS queue 500. The proof of receipt, in the form of an SMS message, may be forwarded to an outbound message queue 510 before being transmitted for receipt by the cellular network. Where the proof of receipt is generated in the form of an SMS message, the proof of receipt may be processed such that it can be sent via the non-SMS communications channel. This may allow the secure element 160 to provide a proof of receipt even where the secure element 160 is not operable to generate and/or transmit messages using a non-SMS communications channel.

In an example, there is provided a method of transmitting configuration data for a secure element for receipt by a host device comprising the secure element. The configuration data being generated in a secure element manager in a cellular communications network as described above. The method comprises securing the configuration data using a set of one or more Over-The-Air, OTA, keys associated with the secure element to generate configuration data for the secure element. The method also comprises transmitting the configuration data over a communication channel secured using an encryption key, other than the said one or more OTA keys, associated with the secure element. As discussed above the secure communications channel may be established between an entitlement configuration server and the host device. In some examples, the configuration data may be in APDU format. The secure communications channel may be secured using the Extensible Authentication Protocol Authentication and Key Agreement (EAP-AKA) as described above.

In an example, there is provided a method of receiving configuration data for a secure element from a cellular communications network. The method comprises receiving configuration data, the configuration data being secured using a set of one or more OTA keys associated with the secure element, over a communications channel secured using an encryption key, other than the said one or more OTA keys, associated with the secure element. The method also comprises forwarding the configuration data to the secure element. In some examples, the configuration data may be in APDU format. This may allow the data to be processed by the secure element. In some examples, the communications channel is secured using EAP-AKA, as described above.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of transmitting configuration data associated with a cellular communications network to a host device comprising a secure element, the method comprising:
   by a secure element manager in the cellular network, receiving from a first server in the cellular network one or more Over-The-Air (OTA) keys associated with the secure element and usable by the secure element for authorizing a source of the configuration data, wherein the first server is configured to maintain OTA keys and to transmit configuration data to the host device using OTA-based Short Messaging Service (SMS) communications;
   by the secure element manager, providing a first-layer encryption of the configuration data using the received one or more OTA keys associated with the secure element to generate OTA-secured configuration data for the secure element;
   by the secure element manager, providing the generated OTA-secured configuration data to a second server in the cellular communication network;
   by the second server, establishing a non-SMS communications channel to the host device and providing a second encryption layer wrapping the OTA-secured configuration data, thereby giving rise to multi-layer encrypted configuration data, wherein the second encryption layer is provided using one or more encryption keys associated with the secure element and being other than the one or more OTA keys; and
   transmitting, by the second server via the non-SMS communications channel, the multi-layer encrypted configuration data to the host device, thereby enabling the host device to decode the second encryption layer using the one or more encryption keys into OTA-secured configuration data, and further authorize the source of the configuration data by using the or more OTA keys to decode the OTA-secured configuration.

2. The method of claim 1, wherein the first server comprises an OTA gateway for sending SMS communications to an SMS center to be transmitted via an SMS communications channel.

3. The method of claim 1, wherein the configuration data is in Application Protocol Data Unit (APDU) format.

4. The method of claim 1, wherein the second server comprises an entitlement configuration server, the entitlement configuration server being arranged to transmit entitlement configuration data to the host device using the non-SMS communications channel.

5. The method of claim 1, comprising receiving a read receipt via the second server indicating that the configuration data has been received by the host device.

6. The method of claim 1, wherein the method comprises identifying information stored in the cellular communications network for configuring the secure element, and wherein the configuration data is generated using the identified information.

7. The method of claim 6, wherein the method comprises receiving a request for configuration data from the host device via the second server and the identifying information stored in the cellular communications network for configuring the secure element is performed in response to the request for configuration data.

8. The method of claim 1, wherein transmitting the configuration data over the non-SMS communication channel is secured using Extensible Authentication Protocol-Authentication and Key Agreement, EAP-AKA applied for creating the second encryption layer for the OTA-secured data.

9. A method of receiving configuration data associated with a cellular communications network at a host device comprising a secure element operatively connected to a subscriber identity module application toolkit (SAT), the method comprising:
   receiving the configuration data via a non-SMS communications channel between the host device and the cellular communication network,
      wherein the configuration data are multi-level encrypted data comprising at least a first encryption layer and a second encryption layer wrapping the first encryption layer,
      wherein the first encryption layer is obtained by using one or more Over-The-Air (OTA) keys associated with the secure element and usable by the secure element for authorizing a source of the configuration data, thus giving rise to OTA-secured configuration data,
      wherein the second encryption layer is obtained by encrypting the generated OTA-secured configuration data using one or more encryption keys and
      wherein the one or more OTA keys differ from the one or more encryption keys;
   using the SAT to process the received configuration data to decode the second encryption layer using the one or more encryption keys into OTA-secured configuration data; and
   forwarding the obtained after decoding OTA-secured configuration data to the secure element for further decoding using the one or more OTA keys and thereby authorizing the source of the configuration data.

10. The method of claim 9, wherein the configuration data is in Application Protocol Data Unit (APDU) format.

11. The method of claim 9, wherein the processed configuration data is further processed by the secure element using a remote file management applet.

12. The method of claim 9, wherein the method comprises querying the network for available configuration data.

13. The method of claim 9, wherein the method comprises generating a proof of receipt of the configuration data and transmitting the proof of receipt to the cellular communications network using the non-SMS communications channel.

14. The method of claim 9, wherein transmitting the configuration data over the non-SMS communication channel is secured using Extensible Authentication Protocol- Authentication and Key Agreement (EAP-AKA) applied for creating the second encryption layer for the OTA-secured data.

15. A cellular communications network for transmitting configuration data to a host device comprising a secure element, the network comprising a secure element manager operatively connected to a first server and a second server, wherein:
the first server is configured to maintain Over-The-Air (OTA) keys usable by the secure element for authorizing a source of the configuration data, and to transmit configuration data to the host device using OTA-based Short Messaging Service (SMS) communications channel;
the secure element manager is configured to receive from the first server one or more OTA keys associated with the secure element, to encrypt the configuration data using the one or more OTA keys to generate OTA-secured configuration data for the secure element and to provide the generated OTA-secured configuration data to the second server; and
the second server is configured to:
establish a non-SMS communications channel to the host device;
receive from the secure element manager the OTA-secured configuration data;
use one or more encryption keys associated with the secure element to wrap the received OTA-secured configuration data thus providing a second encryption layer and giving rise to multi-layer encrypted configuration data, wherein the one or more encryption keys differ from the one or more OTA keys; and
transmit the resulted multi-layer encrypted configuration data to the host device using the non-SMS communication channel, thereby enabling the host device to decode the second encryption layer using the one or more encryption keys into OTA-secured configuration data, and further authorize the source of the configuration data by using the one or more OTA keys to decode the OTA-secured configuration.

16. The cellular communications network of claim 15, wherein the second server comprises an entitlement configuration server, the entitlement configuration server being arranged to transmit entitlement configuration data to the host device.

17. A host device comprising a secure element operatively connected to a subscriber identity module application toolkit (SAT), wherein:
the host device is configured to receive configuration data for the secure element from a cellular network via a non-SMS communications channel, wherein the received configuration data are multi-layer encrypted configuration data having:
a first encryption layer provided using one or more Over-The-Air (OTA) keys associated with the secure element and usable by the secure element for authorizing a source of the configuration data, thus giving rise to OTA-secured configuration data, and
a second encryption layer provided by wrapping the provided OTA-secured configuration data using one or more encryption keys associated with the secure element, and wherein the one or more OTA keys differ from the one or more encryption keys;
SAT is configured to process the received multi-layer encrypted configuration data so to decode, using the one or more encryption keys, the second encryption layer into OTA-secured configuration data and to forward the resulting OTA-secured configuration data to the secure element; and
the secure element is configured to decode, using the one or more OTA keys, OTA-secured configuration data received from SAT, thereby authorizing the source of the configuration data.

* * * * *